INVENTORS
E. O. BAUER
P. E. FOX
W. F. MAC PHERSON
BY Leo Stanger
ATTORNEY 3,433,858
METHOD AND APPARATUS FOR CONTROLLING
CAPACITANCES IN MULTIWIRE STRUCTURES
Erich O. Bauer, East Orange, Paul E. Fox, Warren Township, Somerset County, and William F. MacPherson, South Plainfield, N.J., assignors to Bell Telephone Laboratories, Incorporated, New York, N.Y., a corporation of New York
Filed Dec. 14, 1965, Ser. No. 513,705
U.S. Cl. 264—40                    7 Claims
Int. Cl. B29f, 3/10

ABSTRACT OF THE DISCLOSURE

A servo system controls the difference in the capacitances exhibited between "ground" and each of two respective conductors, as the conductors are being continuously surrounded by plastic insulation to form an extruded pair. It does this by measuring the capacitance difference in the finished product and then by moving the finished product from side to side as it leaves the extruded die so as to change the positions of the conductors in the die relative to the insulating mass being extruded.

---

This invention relates to methods and apparatuses for manufacturing insulated wires, particularly by extruding a single plastic insulating structure between and about two lengths of conductors to form a so-called twin pair or dual pair as described in Patent No. 3,288,895 of A. S. Windeler filed Mar. 13, 1963, and issued Nov. 29, 1966.

Apparatus according to the before-mentioned Windeler application attempts to assure good transmission characteristics in twin pairs by maintaining the capacitive balance between each conductor in the twin pair and the surface of the insulation. It achieves this conductor-to-ground capacitive balance by continuously and alternately measuring the capacitance from one and then the other conductor to an electrode composed of a column of conductive liquid surrounding the outer insulation surface, and then varying the heat applied to each conductor during the extrusion process for the purpose of increasing or decreasing the mass of plastic material formed upon the particular conductor having insufficient plastic insulation. This method of varying the mass of insulation on each conductor in response to unbalance has been found cumbersome and slow. Attempts to relieve these defects in controlling the insulation mass by varying the diameter of the orifice in the extruding die have not changed the situation because such changes require complicated machinery.

An object of the present invention is to simplify wire manufacturing devices, particularly the type disclosed in the before-mentioned application while nevertheless achieving comparable or improved results.

Another object of the invention is to increase the speed with which any required change in capacitance is achieved in the extrusion process in response to the continuous measuring of the finished wire, but without complicating the apparatus.

Still another object of the invention is to achieve changes in the conductor-to-ground capacitances and the capacitance balance with simple structures that substantially do not affect the extruding device.

According to the invention these objects are obtained in whole or in part by measuring the capacity balance as set forth in the before-mentioned patent application and producing a voltage indicative of the unbalance and then moving the wire emerging from the extruding die transverse to the direction of the motion of the wire, and in dependence upon the error voltage so that the position of the travelling conductors passing through the extruding die are changed relative to the inner orifice borders of the die whereby the amount of insulation buildup on one or the other side of the wire is changed.

These and other features of the invention are pointed out in the claims. Other objects and advantages of the invention will become apparent from the following detailed description when read in light of the accompanying drawings wherein:

Figure 1:
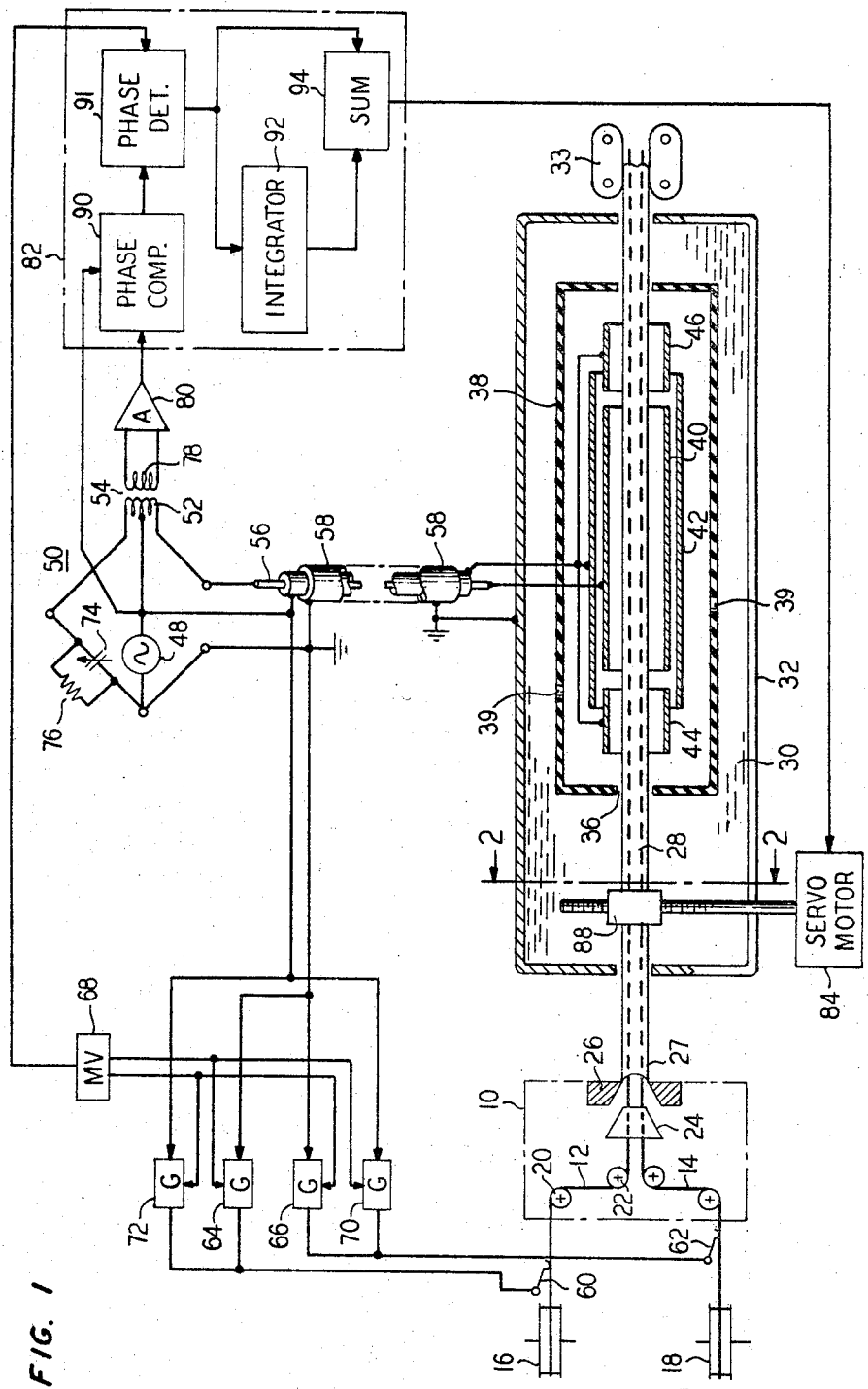
FIG. 1 is a schematic diagram of a twin pair manufacturing apparatus embodying features of the invention.
Figure 2:
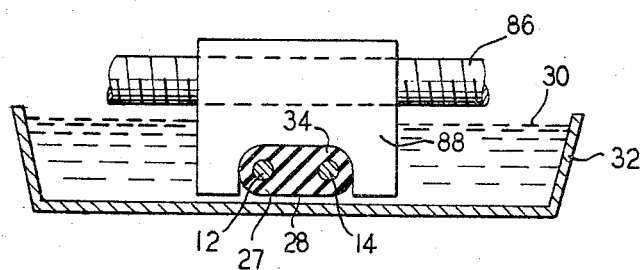
FIG. 2 is a cross section 2—2 of FIG. 1.

In FIG. 1 the general manufacturing operation follows that described in Patent No. 3,288,895 of A. S. Windeler. Here an extruder 10 receiving wire conductors 12 and 14 off two rolls 16 and 18 directs the conductors by means of sheaves 20 and 22 as well as an insulated core tube 24 through an extruding die 26 which applies a layer of thermoplastic insulation 27 such as solid or cellular polyethylene onto the two conductors. This forms a structure 28 such as shown in cross section in FIG. 2. Again as in the Windeler application the structure 28 which has been designated in the art as a twin pair or dual pair passes into water 30 that forms a cooling bath in a trough 32. The water 30 in the trough 32 cools the plastic 27 extruded onto the conductors 12 and 14 by the extruder 10 into a firm mass. A capstan 33 draws the pair structure 28 through the entrance and exit orifices 36 and 37 of a probe 38 surrounding the elongated and moving twin pair within the water bath. The probe 38 includes suitable openings 39 for receiving the water 30 and thereby immersing a measuring electrode 40 and the three guard electrodes 42, 44 and 46 coaxially surrounding the twin pair 28 as it passes through the probe 38 in the water bath. The water 30 is normal tap water and thus substantially conductive.

The probe 38 is made to measure the capacitance unbalance between the outside surface of the insulation 34 and the respective conductors 12 and 14 by passing alternating current from a 20 kilocycle per second voltage source 48 in a capacitance bridge 50 through a half of a winding 52 on a hybrid transformer 54, through the center conductor 56 of a three layer coaxial cable 58, and through the column of water connecting the electrode 40 to the surface of the insulation 27, through the capacitance between one of the conductors 12 or 14 and surface of insulation 27, through one of two contacts 60 or 62 that establish sliding or rolling contact with the conductors 12 and 14, and through one of two conducting gates 64 or 66 to ground. The source 48 applies an almost identical current directly to the guard electrodes 42, 44 and 46 to restrict the potential gradients and current paths between the electrode 40 and the column of liquid contacting the surface of insulation 34 to the confines surrounded by the cylindrical measuring electrode 40. This is accomplished by suitably spacing the electrodes 44 and 46 from the measuring electrode 40.

To make sure that only one conductor 12 or 14 is included in the measurement at one time a 40 cycle-per-second multivibrator 68 alternately switches on only one of the gates 64 and 66. At the same time it switches on a respective gate 70 or 72 that connects the other conductor 14 or 12 directly to the ungrounded end of source 48. Thus the capacitances between the water in the column surrounded by the electrode 40 and respective conductors 12 and 14 alternately affect the current from source 48.

The bridge 52 compares the alternating impedance encountered by the current in the probe 38 with a reference impedance comprising a capacitor 74 and resistor 76 by having the same source 48 pass a reference current through this reference impedance and through the upper half of winding 52. In the winding 52 the positive current flows of each half are opposing. Hence they are subtractive and 180° out of phase. A secondary winding 78 conveys to an amplifier 80 a voltage representing the difference between the continuously alternating impedance in the probe 38 and the reference impedance composed of resistor 70 and capacitor 68. The phase of this voltage difference depends upon whether the current in the upper or lower half of winding 52 predominates, and hence upon whether the impedance measured by probe 38 is greater or less than the reference impedance. Since the impedance measured by the probe 38 constantly shifts between one and the other conductor, the output voltage is modulated unless the respective conductor-to-ground capacitances balance. The amplifier 80 applies this revealing signal to a servo control 82. The before-mentioned process is substantially in accordance with that described in the earlier noted Windeler patent.

According to the invention the signal appearing at the amplifier 80 and the servo control 82 drives a servo motor 84 that rotates a worm gear 86. The latter extends transversely across the twin pair 28 in the trough 32 and drives a saddle 88, shown more specifically in FIG. 2, that fits over the twin pair 28. The saddle 88 is located between the die 26 and the probe 38 at a point on the travelling twin pair 28 where the insulation 34 has begun to solidify.

By moving the saddle 88 with the worm screw 86 in accordance with signals indicating the extent of unbalance at the servo control 82 the positions the conductors 12 and 14 assume relative to the center axis of the die 26 as they emerge from the core tube 24 varies. Thus the amount of insulation extruded about each one of the conductors also varies. The resulting structure affects the probe 38 so as to prevent the motor from making further corrections.

In FIG. 1 the servo control 82 operates by comparing the phase of modulated 20 kc. signals appearing at the amplifier 80 with that of the source 48. A positive departure from the reference capacitance 74 at any one time produces signals at winding 72 which are 180° out of phase with a negative departure. Thus the signal at the output of comparator 90 has an instantaneous value equal the instantaneous departure of one or the other conductors 12 or 14. However this signal varies at the frequency of 40 cycles because the multivibrator 68 causes the bridge to measure the capacitances at conductors 12 and 14 alternately at that rate. Thus the output at comparator 90 is a 40 cycle A.C. signal. A phase detector 91 determines with which measuring half-cycle the positive and negative portions of the multivibrator voltage coincide. The result is a positive or negative direct voltage that indicates whether the capacitance at conductor 12 or 14 is too high. This is the error signal. It passes through a summing circuit 94 to drive the servo motor 84 in one or the other direction depending on its polarity. The servo control 82 avoids leaving residual errors over a long period by integrating a portion of the error signal from detector 91 in an integrator 92 and adding it to the instantaneous error signal in a summing circuit 94.

In operation an extruder 10 extrudes plastic insulation about two conductors 12 and 14 by passing them through a die 26. A cooling trough 32 having water 30 therein cools the resulting structure so that the capacitive balance can be measured in a probe 38. The latter surrounds the twin pair coaxially with four electrodes. A hybrid capacitive bridge 50 forms an electrode about the outer surface of the insulation 34 with a column of liquid and alternately measures the capacitance of one of the two conductors 12 and 14 relative to the liquid electrode. The multivibrator 68 ultimately connects one or the other conductor into the circuit being measured and at the same time effectively removes the other conductor. Where unbalance exists an alternating 40 cycle current appears at the amplifier 80. The phase comparator 90 in the servo control circuit 82 compares the phase of the signal in winding 78 with the phase in the source 48 to produce a 40 cycle signal whose instantaneous value represents the departure of one and then the other impedance at the conductors 12 and 14 in the probe 38 from the reference impedance of resistor 76 and capacitor 74. The peak-to-peak value represents the capacitive unbalance of the conductors.

A phase detector 91 compares the phase of the 40 cycle per second alternating signal with that of the multivibrator 68 so as to determine which capacitance is too low. The summing circuit 94 combines the resulting error signal with a signal that represents the accumulation of the previous errors. This accumulated signal although making up only a small portion of the total output signal attempts to correct for accumulated derivations. The output signal from the summing circuit 94 activates the servo motor 84 in one or the other direction to turn the screw 86 thereby moving the saddle 88 axially across the travelled direction of the twin pair 28. It carries with it the twin pair 28 so as to change the position of the conductors 12 and 14 relative to the die.

Figure 3:
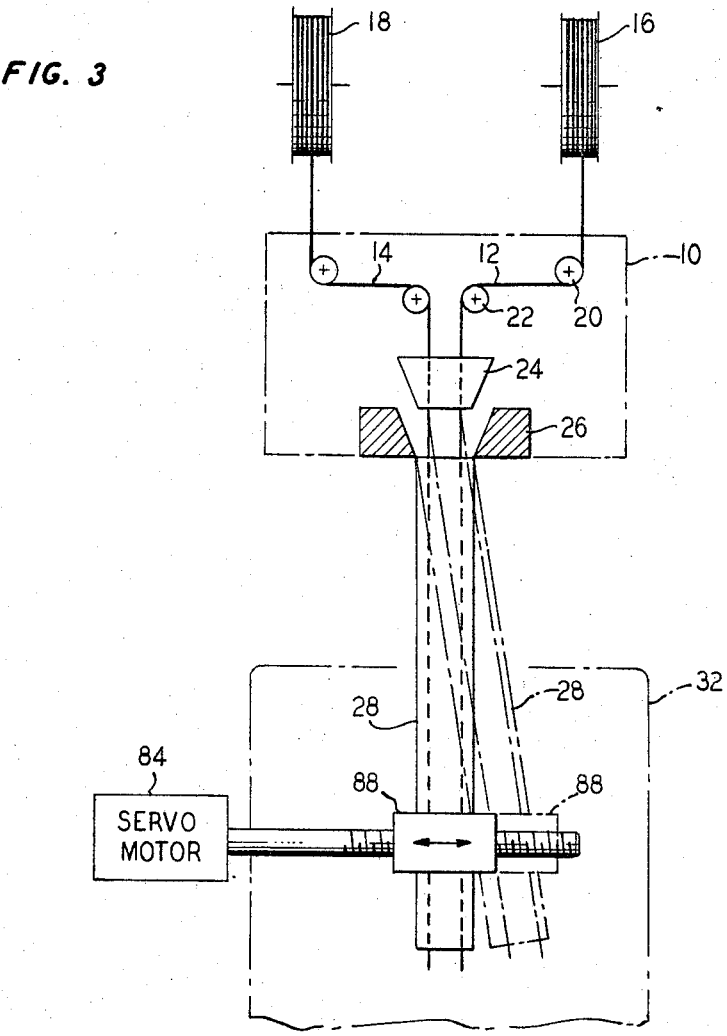
FIG. 3 is a schematic illustration showing details of the manner in which the present invention operates.

FIG. 3 illustrates the saddle 88 in two positions. For clarity the departure from the central position is exaggerated. In solid lines the saddle 88 guides the twin pair 28 into a position of alignment with the core tube 24. In that position the conductors 12 and 14 are positioned centrally and symmetrically within the output orifice of the die 26. If the saddle 88 assumed the position shown in dot-dash lines the position of the wires 12 and 14 following a straight line between core tube 24 and the saddle 88 shift over toward the right edge of the orifice in the die 26. Thus the die extrudes less material close to the conductor 12 than near the conductor 14. This changes the capacitance balance from conductor to ground. Moving the saddle 88 back and forth with servo motor 84 achieves the desired corrections.

While an embodiment of the invention has been described in detail it will be obvious to those skilled in the art that the invention may be embodied otherwise without departing from its spirit and scope.

What is claimed is:

1. Apparatus for manufacturing insulated wires comprising a die, forming means for drawing conductor means through said die and extruding insulation about said conductor means, liquid holding means in the path of said conductor means for holding a conductive liquid, servo means extending into said liquid holding means and about said conductor means for measuring the capacitance between the liquid and said conductor means and for producing a signal corresponding to the departure of the measured capacitance from a given capacitance, said measured capacitance and hence said signal being dependent upon the position of said conductor means in said wire, and motor means responding to the signal from said servo means for moving the extruded wire transversely relative to said die so as to change the position of said conductor means in the insulation being extruded and hence vary the measured capacitance.

2. Apparatus for manufacturing multiconductor wires comprising a die, forming means for drawing conductors through said die and extruding insulation about them, liquid holding means in the path of said conductors for cooling the extruded insulation passing from the die, servo means extending into said liquid means and about said conductors for alternately measuring the capacitance between each conductor and liquid in said holding means and for producing a signal corresponding to the capacitance difference between the measurements, said capacitance and hence said signal being a function of the position of said conductors in said wire and motor means responding to the signal from said servo means for moving the extruded wire transversely relative to said die so as to change the position of said conductors in the insulation being extruded and hence vary the measured capacitances.

3. An apparatus as in claim 2 wherein said motor means include guide means for contacting the sides of the wire, and screw means for moving said guide means transverse to the direction of the travel of said wire.

4. Apparatus as in claim 3 wherein said guide means includes a saddle fitting over the completed wire.

5. Apparatus as in claim 3 wherein said forming means includes a core tube aligned with said die for guiding said conductors to said die, whereby the wire extends between said core tube and said guide means and is positioned by said guide means and said core tube relative to said die.

6. The method of manufacturing insulated wires which comprises extruding plastic insulation about conductor means passing through a die, monitoring the capacitance of the conductor means relative to a conductor surrounding the surface of the insulation extruded thereon, and moving the thus manufactured wire transverse to its direction of travel as it emerges from the die so as to change the position of the conductor means relative to the die and hence change the measured capacitance.

7. The method of manufacturing multiconductor wires which comprises simultaneously extruding insulation about said conductors as said conductors move through a die, sequentially measuring the capacitance of each conductor relative to liquid surrounding the conductor wherein the liquid is conductive, establishing a voltage corresponding to the unbalance in the phase measuring of said wires, and moving said wires as they emerge from the die transverse to their direction of travel in response to the thus produced voltage so as to change the measured capacitances toward a minimum capacitance difference.

References Cited

UNITED STATES PATENTS 3,288,895   11/1966   Windeler _____ 264—40

FOREIGN PATENTS 143,072   7/1961   U.S.S.R.

ROBERT F. WHITE, *Primary Examiner.*

J. H. SILBAUGH, *Assistant Examiner.*

U.S. Cl. X.R.

264—174; 18—2, 13